US007520485B1

(12) United States Patent
Giannetto

(10) Patent No.: US 7,520,485 B1
(45) Date of Patent: Apr. 21, 2009

(54) MULTI-MODE BEACH UMBRELLA ANCHOR

(76) Inventor: Salvatore Giannetto, 35 Acorn La., Plainview, NY (US) 11803

( * ) Notice: Subject to any disclaimer, the term of this patent is extended or adjusted under 35 U.S.C. 154(b) by 0 days.

(21) Appl. No.: 11/982,623

(22) Filed: Nov. 2, 2007

(51) Int. Cl.
*F16M 13/00* (2006.01)
(52) U.S. Cl. ...................... 248/530; 248/156; 248/545; 173/91; 43/21.2
(58) Field of Classification Search ................. 248/530, 248/532, 545, 156, 539, 540, 541, 538, 520; 173/91, 126; 135/19, 20.1, 31, 33.5; 43/21.2
See application file for complete search history.

(56) References Cited

U.S. PATENT DOCUMENTS

| | | | |
|---|---|---|---|
| 1,943,018 A | | 1/1934 | Hench |
| 2,475,041 A | | 7/1949 | Mattson |
| 2,759,486 A | | 8/1956 | Pesaturo |
| 3,483,727 A | | 12/1969 | Giannetto |
| 3,823,785 A | | 7/1974 | Toliver |
| 3,995,796 A | * | 12/1976 | Kline ........................ 248/121 |
| 4,096,951 A | * | 6/1978 | Menssen ..................... 211/207 |
| 4,459,787 A | | 7/1984 | Wilcox |
| 4,625,937 A | * | 12/1986 | Haase ........................ 248/545 |
| 4,960,064 A | * | 10/1990 | Mestas et al. .......... 114/230.26 |
| 5,152,495 A | | 10/1992 | Jacinto |
| 5,390,685 A | * | 2/1995 | McCoy ........................ 135/19 |
| 5,518,218 A | | 5/1996 | Leonard |
| 5,699,864 A | * | 12/1997 | Dvorak et al. ................. 173/91 |
| 6,328,046 B2 | | 12/2001 | Doreste |
| 6,908,067 B2 | * | 6/2005 | Clasen ....................... 248/533 |

* cited by examiner

*Primary Examiner*—Anita M King
(74) *Attorney, Agent, or Firm*—Alfred M. Walker

(57) ABSTRACT

A multi-purpose beach anchor provides a sturdy base for at least one of a small, medium or large sized beach umbrella as well as for an optional table and an optional tubular holder for a fishing rod. The rigidity of the anchor is secured by an integral hand operable slide hammer mechanism for driving the spike element into the sand for an optimal distance straight down. This slide hammer is used by sliding up and down over a tubular support member atop the spike, wherein the spike has an integral strike collar. A few short strokes of the weighted slide hammer element drives the spike into the sand or other terrain. A hand screw is then used to lock the hammer weight to the tubular support and the spike rigidly. An umbrella shaft can then be directly slid over the support tube and locked in place.

15 Claims, 2 Drawing Sheets

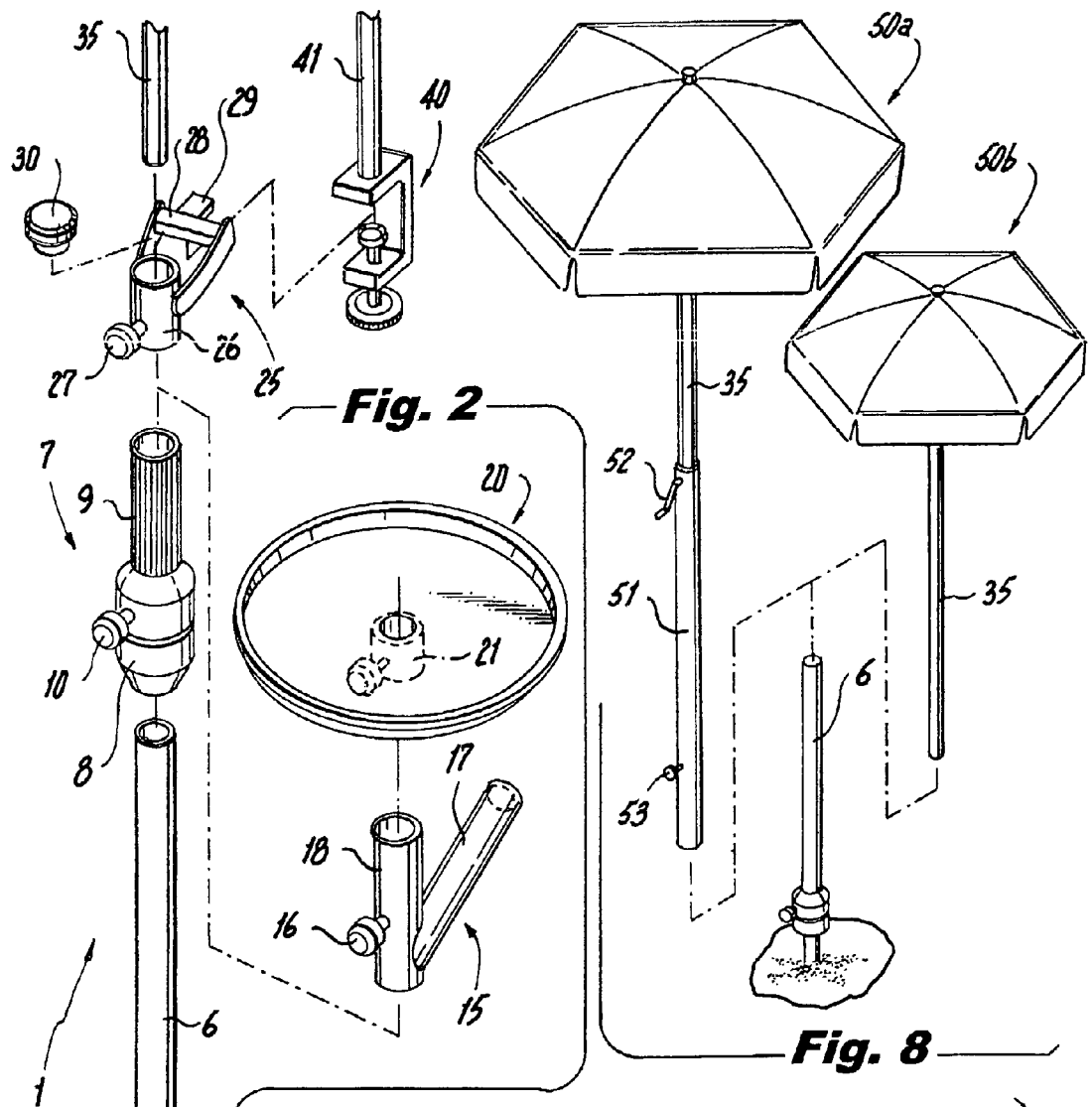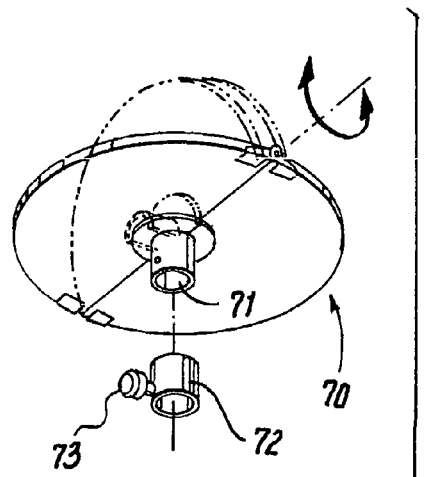

MULTI-MODE BEACH UMBRELLA ANCHOR

FIELD OF THE INVENTION

The present invention relates to anchors for stabilizing a beach umbrella in sand or other terrain.

BACKGROUND OF THE INVENTION

Beach umbrellas are typically erected on a sandy beach by grasping the shaft and forcing the integral pointed spike at its distal end into the sand with several rotary motions. Depending on the sand consistency, this task may be difficult. Often, the spiked end is not driven far enough and the umbrella topples when hit by a gust of wind. Another popular method of erecting a beach umbrella is via an integral clamp designed to attach to the frame of a beach chair. This may problematic when the light weight chair is unoccupied, and the same fate of a toppled umbrella may result.

Also, accessories such as an anchored small table or tray are not available. Another convenient accessory would be an anchored holder to receive the handle of a fishing rod.

OBJECTS OF THE INVENTION

It is therefore an object of the present invention to provide a secure anchor for a beach umbrella in beach sand and in other outdoor terrain.

It is also an object of the present invention to provide secure anchor for a beach umbrella which resist being toppled over in wind gusts.

Other objects which become apparent from the following description of the present invention.

SUMMARY OF THE INVENTION

The present invention provides a multi-purpose beach anchor which provides a sturdy base for a beach umbrella as well as for an optional table and tubular holder for a fishing rod for surf casting for fish at a beach. The rigidity of the anchor is guaranteed by an integral mechanism for driving the spike element into the sand an optimal distance straight down. This mechanism is a slide hammer which is used by sliding up and down over a tubular support member atop the spike; the spike has an integral strike collar. A few short strokes of the weighted slide hammer element drives the spike into the most stubborn of sand conditions. A hand screw is then used to lock the hammer weight to the tubular support and the spike rigidly. An umbrella shaft can then be directly slid over the support tube and locked in place. The anchor can also be used in other soft terrain areas, such as a turf covered topsoil terrain of light or medium density.

Alternatively, an optional two-tube assembly of this invention can be slid over the support tube and locked in place. The support tube can also support a small circular table which is locked in place. The umbrella can then be mounted such that its shaft is concentric with the table by the use of a clamp accessory. The clamp accessory also has an offset member which accommodates an umbrella with a clamp normally intended for attachment to a beach chair. The angled tube of this assembly is rigidly attached to the vertical tube portion as by welding (for example); it is pitched upward with respect to the horizontal and of such diameter as to form a holder which accepts the handle of a fishing rod.

Another embodiment of this invention relates to a spike member with fluted features along its sides to enhance its resistance to toppling by virtue of greater surface area in contact with the sand. The fluted anchor can also be used in other harder terrain areas, such as a turf covered topsoil terrain of medium density. Yet another embodiment introduces a folding table which is compatible with this multi-mode anchor.

In a preferred embodiment, the multi-mode beach umbrella anchor has a means for holding one of three beach umbrellas, including a small beach umbrella attachable normally to a folding chair; a medium sized umbrella having a spike insertable in the ground, and a large sized umbrella having a spike insertable in the ground and a crank for raising the umbrella web.

For example, for a small chair-attachable beach umbrella, a collar clamp is attached to the upper end of the cylindrical support tube for supporting a small umbrella chair attachable support clamp which clamps the beach umbrella shaft. The clamp collar preferably includes an anti-rotation tab to prevent rotation of the umbrella supporting clamp, wherein the clamp has a horizontal offset member for engaging a clamp on a bottom end of an umbrella pole normally used for attachment to a beach chair.

For a medium sized beach umbrella, the support tube of the present invention has a predetermined minimum diameter permitting a lower end of an umbrella shaft of a medium sized beach umbrella to be received within the support tube and clamped.

For a large umbrella with a crank which is used to open and close the beach umbrella, the support tube has a maximum diameter permitting a hollow large umbrella support shaft being able to be slidable over the support tube to support the larger beach umbrella

BRIEF DESCRIPTION OF THE DRAWINGS

The present invention can best be understood in connection with the accompanying drawings. It is noted that the invention is not limited to the precise embodiments shown in drawings, in which:

FIG. 2 is a perspective exploded view of the various components of this invention.

FIG. 6 is a perspective detail of an alternate embodiment spike with fluted sides.

FIG. 7 is a perspective view of an alternate embodiment table which folds for storage.

FIG. 8 is a perspective of an alternate attachment of a medium size beach umbrella and a large size beach umbrella having an adjusting crank.

DETAILED DESCRIPTION OF THE INVENTION

Figure 1:
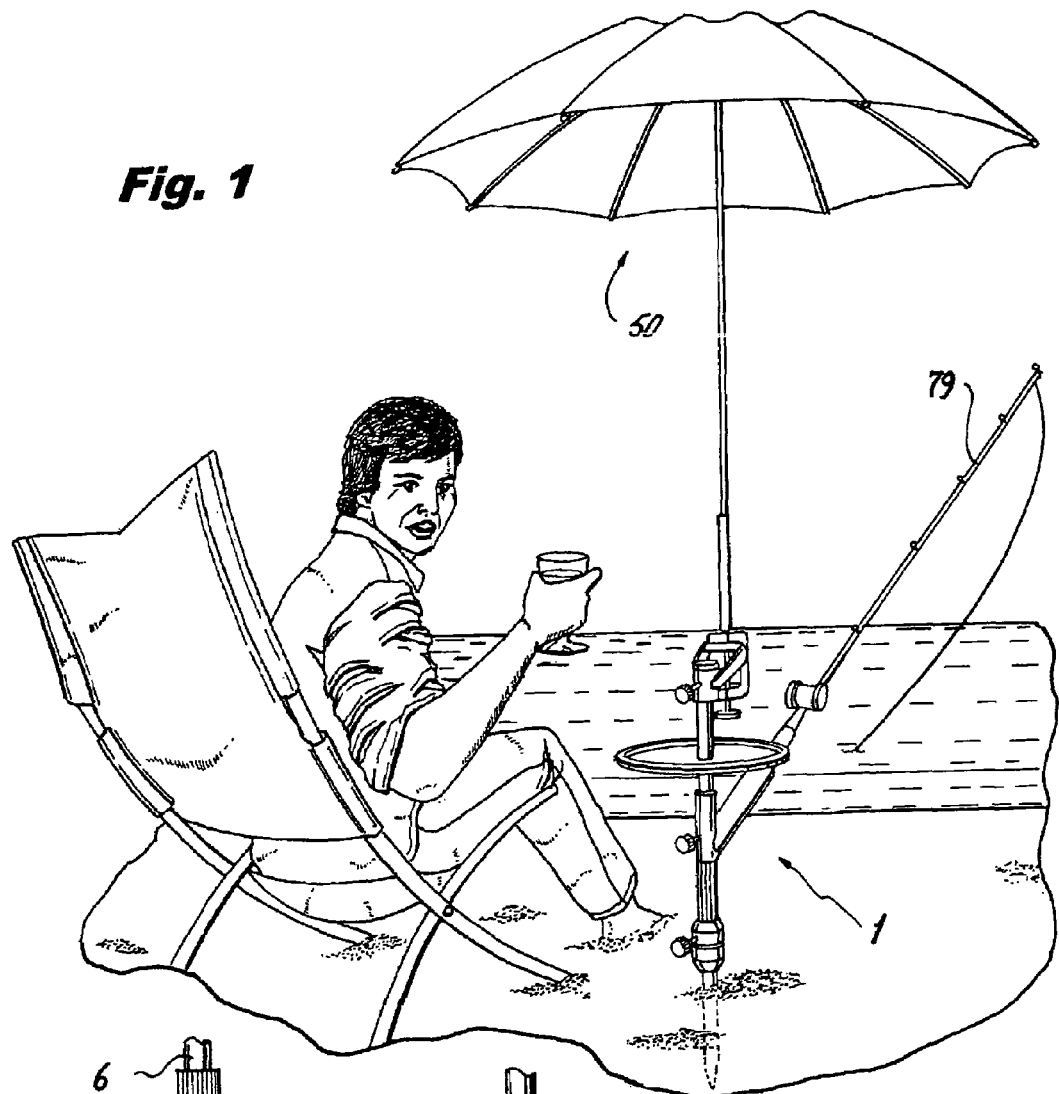
FIG. 1 is a perspective view of the multi-mode beach umbrella anchor of this invention in use at water's edge.

The multi-mode beach umbrella anchor 1 of this invention is shown in use in FIG. 1. The various parts are described in FIG. 2 which shows an exploded view. A spike 5 with striking collar 4 is shown under hollow cylindrical support tube 6 which slides over the upper extension of spike 5 beyond collar 4.

The multi-mode beach umbrella anchor 1 can anchor small beach umbrella 50 (such as is conventionally attachable to a chair) as in FIG. 1. It can also anchor medium size umbrella 50b or large size umbrella 50a, as in FIG. 8.

Slide hammer assembly 7 is a member with a central hole and includes weight 8, cylindrical manual grasping handle 9, which is preferably fluted, and a locking hand fastener, such as a screw 10. The upper portion of weighted portion 8 is wider than cylindrical manual grasping handle 9, to allow the lower portion of the person's fist to rest against the wider portion of weighted portion 8. However, weighted portion 8 is preferably convex in the area immediately below cylindrical handle 9, so that the bottom of a person's fist grasping cylindrical handle 9 contacts gently against the convex upper portion of weighted portion 8 when the person forcefully thrusts the weighted portion 8 downward, without appreciably reducing the downward thrust of the person's fist about cylindrical handle 9.

Figure 3:
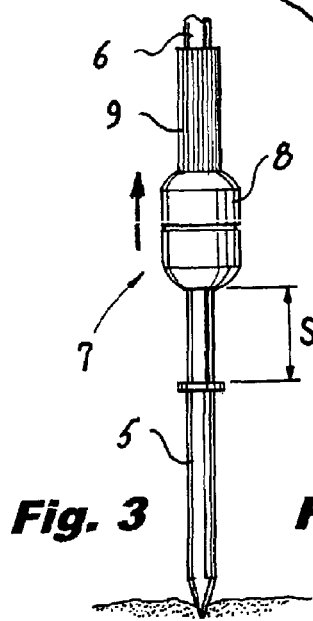
FIG. 3 is a side elevation detail of the spike with slide hammer in an upward position.
Figure 4:
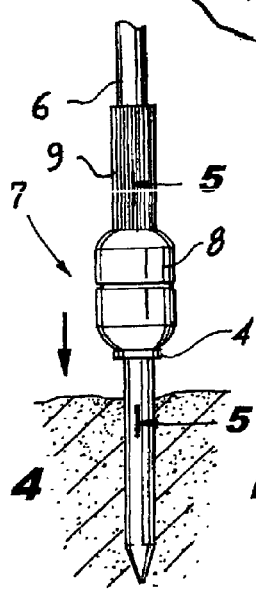
FIG. 4 is a side elevation detail of the spike embedding in sand with the slide hammer in its lower position.
Figure 5:
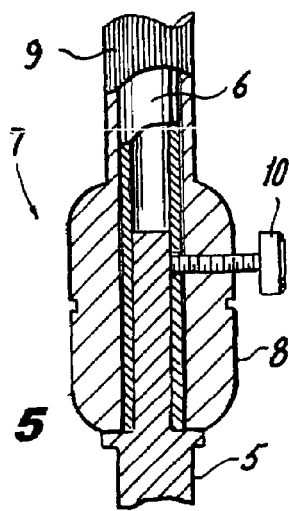
FIG. 5 is a crossectional side view of the slide hammer assembly in locked position.

The detail views of FIGS. 3, 4 and 5 show the construction as well as the operation of slide hammer 7.

FIG. 2 also shows that cylindrical spike 5 has a tapered pointed spike at a lower end thereof. An annular collar 4 is located between a lower end and an upper end of the spike 5. A solid, cylindrical stem section extends up from the annular collar 4 to the upper end of the spike 5. The hollow cylindrical support tube 6 extends over the stem section concentrically, so that a lower end of the hollow support tube 6 rests on the collar 4. Slide hammer assembly 7 has a cylindrical bore slidably mounted on the cylindrical support tube 6, wherein spike hammer assembly 7 slides along the outside of hollow support tube 6 between a lower position engaging the collar 4 and an upper resting start position along hollow support tube 6.

In FIG. 3, slide hammer 7 is raised a stroke distance "S" above strike collar 4; it slides over support tube 6.

In FIG. 4 after striking collar 4, slide hammer 7 is at its lowest position and spike 5 has been driven into the sand (shown in crossection).

FIG. 5 shows the locking of hammer 7 through a side hole in support tube 6 to spike 5 using hand screw 10.

Slide hammer assembly 7 having a weighted lower portion 8 below manually graspable handle portion 9 located above weighted portion 8.

Pointed spike 5 is adapted to penetrate a ground, such as beach sand or other terrain. Manual movement of slide hammer assembly 7 drives pointed spike 5 into the ground when weighted portion 8 of slide hammer assembly 7 is forcibly thrust downwardly against collar 4 of pointed spike 5.

FIG. 2 also shows optional two-tube fishing rod holder assembly 15 with vertical tube 18, angled tube member 17 and locking hand screw 16; this is slid onto the distal end of column 6 and would rest atop slide hammer handle 9 (see final position in FIG. 1). FIG. 1 also shows fishing rod 79 supported within tube 17.

FIG. 2 also depicts an optional table 20 supported by a locking collar 21 fitting over either support tube 6 by itself or over vertical tube 18 of optional fishing rod holder assembly 15. Oblique fishing rod tube section 17 is set at a predetermined oblique angle to retain the fishing rod therein while also providing a clearance for an outer edge of table 20 away from the fishing rod extending at the predetermined oblique angle therein. Top extension of support tube 6 receives locking collar 21 attached to the bottom of table 20 (final position above two-tube assembled is visible in FIG. 1). Collar clamp 25 (retained via screw 27 on collar 26) fits at the top of support tube 6 and provides a horizontal offset 28 for attachment of an umbrella supporting clamp 40 at the distal end of shaft 41 of an umbrella designed for attachment to beach chairs. In this case, cap 30 is used to close the hole at the end of column 6.

Alternatively, the end of a shaft 35 of an umbrella is fitted within the distal end of support column 6. Tab 29 is provided to prevent rotation of clamp 40 about horizontal offset 28 of umbrella clamp 25.

FIG. 8 shows an alternative use of the anchor of this invention simply to support a larger beach umbrella 50a with a larger diameter support shaft 51 which slides over support tube 6 and is locked in place via screw 53. Umbrellas of this type often have adjusting cranks 52 to open and close the canopy. FIG. 8 also shows the use of the anchor of this invention to support a medium size umbrella 50b with a medium sized support shaft 35 which slides into support tube 6.

FIG. 6 shows an alternate embodiment involving the substitution of fluted spike 60 (for spike 5) and support tube 62 (for tube 6). Spike 60 has a stud 61 extending a short distance from the side of its top extension; this engages keyway 63 at the distal end of tube 62. Fluted spike 60 has greater surface area in contact with the sand or other terrain and affords better resistance to toppling than spike 5.

FIG. 7 shows an alternate embodiment table 70 which folds for easy storage or handling. The attachment collar 71 is split and also folds. A non-split locking collar 72 with retaining hand screw 73 is used for locking split collar 71 to support tube 6 or 62. For example, table 70 is foldable about a hinge and has a split attachment collar 71 at a central region thereof for insertion of support tube 6 or 62 therein. Split attachment collar 71 is also foldable. The non-split locking collar 71 has a central recess hole also for insertion of the support tube 6 or 62 therein. The non-split locking collar 72 is lockable upon the support tube 6 or 62 and the non-split locking collar 72 supports the foldable table 70 and the split attachment collar 71 in a flat planar configuration above the non-split locking collar 72 and around the support tube 6 or 62.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A multi-mode beach umbrella anchor comprising:
 a cylindrical spike member having a spike at a lower end thereof, an annular collar located between said lower end and an upper end, and a solid, cylindrical stem section extending up from said collar to said upper end;
 a cylindrical support tube extending over said stem section concentrically, a lower end of said support tube resting on said collar;
 said cylindrical support tube to be adapted to support at least one of a clamp for a small umbrella, a support shaft for a medium sized umbrella or a support shaft for a large umbrella;
 a slide hammer assembly having a cylindrical bore slidably mounted on said cylindrical support tube, said assembly being slidable along said support tube between a lower position engaging said collar and an upper position along said support tube;
 said slide hammer assembly having a weighted lower portion and a cylindrical handle portion above said weighted portion;
 whereby said spike is adapted to penetrate a ground, said slide hammer assembly driving said spike into said ground when said slide hammer assembly is thrust downwardly against said collar.

2. The multi-mode beach umbrella anchor of claim 1 wherein an upper portion of said weighted portion is wider than said cylindrical manual grasping handle, thereby allowing a lower portion of the person's fist to rest against said wider upper portion of said weighted portion, wherein said weighted portion is convex in the area immediately below said hollow cylindrical handle, so that the bottom of a person's fist grasping said cylindrical handle contacts gently against said convex upper portion of said weighted portion when the person forcefully thrusts said weighted portion downward, without reducing the downward thrust of the person's fist about said cylindrical handle.

3. A multi-mode beach umbrella anchor comprising:
a cylindrical spike member having a spike at a lower end thereof, an annular collar located between said lower end and an upper end, and a solid, cylindrical stem section extending up from said collar to said upper end;
a cylindrical support tube extending over said stem section concentrically, a lower end of said support tube resting on said collar;
said cylindrical support tube to be adapted to support at least one of a clamp for a small umbrella, a support shaft for a medium sized umbrella or a support shaft for a large umbrella;
a slide hammer assembly having a cylindrical bore slidably mounted on said cylindrical support cube, said assembly being slidable along said support tube between a lower position engaging said collar and an upper position along said support tube;
said slide hammer assembly having a weighted lower portion and a cylindrical handle portion above said weighted portion;
whereby said spike is adapted to penetrate a ground, said slide hammer assembly driving said spike into said ground when said slide hammer assembly is thrust downwardly against said collar;
wherein an upper portion of said weighted portion is wider than said cylindrical manual grasping handle, thereby allowing a lower portion of the person's fist to rest against said wider upper portion of said weighted portion, wherein said weighted portion is convex in the area immediately below said hollow cylindrical handle, so that the bottom of a person's fist grasping said cylindrical handle contacts gently against said convex upper portion of said weighted portion when the person forcefully thrusts said weighted portion downward, without reducing the downward thrust of the person's fist about said cylindrical handle.

4. The multi-mode beach umbrella anchor of claim 3 in which said slide hammer assembly has means to lock said slide hammer assembly and support tube in a fixed position on said stem section.

5. The multi-mode beach umbrella anchor of claim 3 in which a collar clamp is attached to the upper end of said cylindrical support tube for supporting an umbrella support clamp clamping said beach umbrella shaft.

6. The multi-mode beach umbrella anchor as in claim 5 in which said clamp collar includes an anti-rotation tab to prevent rotation of said umbrella supporting clamp.

7. The multi-mode beach umbrella anchor of claim 6 in which said clamp has a horizontal offset member for engaging a clamp on a bottom end of an umbrella pole designed for attachment to a beach chair.

8. The multi-mode beach umbrella anchor of claim 3 in which a lower end of an umbrella shaft is received within said support tube and clamped.

9. The multi-mode beach umbrella anchor of claim 3 further comprising a hollow umbrella support shaft which goes over said support tube to support a larger beach umbrella, said support shaft having a crank to open and close said beach umbrella.

10. The multi-mode beach umbrella anchor of claim 3 having a table assembly mounted on said support tube supporting said beach umbrella.

11. The multi-mode beach umbrella anchor as in claim 6 wherein said table is foldable about a hinge, said table having a split attachment collar hole at a central region thereof for insertion of said support tube therein, said split attachment collar being foldable, wherein a non-split locking collar has a central recess hole also for insertion of said support tube therein, said non-split locking collar being lockable upon said support tube, said non-split locking collar supporting said foldable table and said split attachment collar in a flat planar configuration above said non-split locking collar and around said support tube.

12. The multi-mode beach umbrella anchor of claim 3 having a fishing rod tube extending from a two tube fishing rod holder assembly for supporting a lower end of a fishing pole at an angle between horizontal and vertical, said two tube assembly having a vertical tube section which is supported by said cylindrical support tube and an oblique angled tube section receiving the fishing rod therein.

13. The multi-mode beach umbrella anchor of claim 12 wherein a table assembly is mounted on said vertical tube section of said fishing rod holder assembly, wherein further a predetermined angle between said oblique angled tube section and said vertical tube section provides a clearance beyond and over an edge of said table.

14. The multi-mode beach umbrella anchor of claim 1 in which said spike is fluted.

15. A multi-mode beach umbrella anchor comprising:
a cylindrical spike member having a spike at a lower end thereof, an annular collar located between said lower end and an upper end, and a solid, cylindrical stem section extending up from said collar to said upper end;
a cylindrical support tube extending over said stem section concentrically, a lower end of said support tube resting on said collar;
said cylindrical support tube to be adapted to support at least one of a clamp for a small umbrella, a support shaft for a medium sized umbrella or a support shaft for a large umbrella;
a slide hammer assembly having a cylindrical bore slidably mounted on said cylindrical support cube, said assembly being slidable along said support tube between a lower position engaging said collar and an upper position along said support tube;
said slide hammer assembly having a weighted lower portion and a cylindrical handle portion above said weighted portion;
whereby said spike is adapted to penetrate a ground, said slide hammer assembly driving said spike into said ground when said slide hammer assembly is thrust downwardly against said collar;
wherein an upper portion of said weighted portion is wider than said cylindrical manual grasping handle, thereby allowing a lower portion of the person's fist to rest against said wider upper portion of said weighted portion, wherein said weighted portion is convex in the area immediately below said hollow cylindrical handle, so that the bottom of a person's fist grasping said cylindrical handle contacts gently against said convex upper portion of said weighted portion when the person forcefully thrusts said weighted portion downward, without reducing the downward thrust of the person's fist about said cylindrical handle;

said slide hammer assembly having locking means to lock said slide hammer assembly and support tube in a fixed position on said stem section;

said multi-mode beach umbrella anchor having means for holding one of three beach umbrellas, including a small beach umbrella attachable normally to a folding chair; a medium sized umbrella having a spike insertable in the ground, and a large sized umbrella having a spike insertable in the ground and a crank for raising the umbrella web;

said means for holding comprising a) for a small chair-attachable beach umbrella, an optional collar clamp being attached to the upper end of said cylindrical support tube for supporting a small umbrella chair attachable support clamp clamping said beach umbrella shaft, said clamp collar includes an anti-rotation tab to prevent rotation of said umbrella supporting clamp, said clamp having a horizontal offset member for engaging a clamp on a bottom end of an umbrella pole normally used for attachment to a beach chair;

b) for a medium sized beach umbrella, said support tube having a predetermined minimum diameter permitting a lower end of an umbrella shaft of a medium sized beach umbrella to be received within said support tube and clamped; and, c) for a large umbrella with a crank, said support tube having a maximum diameter permitting a hollow large umbrella support shaft being able to be slidable over said support tube to support the larger beach umbrella, said support shaft having a crank to open and close said beach umbrella;

a table assembly mounted on said support tube supporting said beach umbrella, wherein said table is foldable about a hinge, said table having a split attachment collar hole at a central region thereof for insertion of said support tube therein, said split attachment collar being foldable, wherein a non-split locking collar has a central recess hole also for insertion of said support tube therein, said non-split locking collar being lockable upon said support tube, said non-split locking collar supporting said foldable table and said split attachment collar in a flat planar configuration above said non-split locking collar and around said support tube;

a fishing rod tube extending from a two tube fishing rod holder assembly for supporting a lower end of a fishing pole at an angle between horizontal and vertical, said two tube assembly having a vertical tube section which is supported by said cylindrical support tube and an oblique angled tube section receiving the fishing rod therein;

wherein said table assembly is mounted on said vertical tube section of said fishing rod holder assembly, wherein further a predetermined angle between said oblique angled tube section and said vertical tube section provides a clearance beyond and over an edge of said table.

* * * * *